Nov. 30, 1954 — T. O. KOSATKA — 2,695,801
FLUID SEAL
Filed Oct. 23, 1953
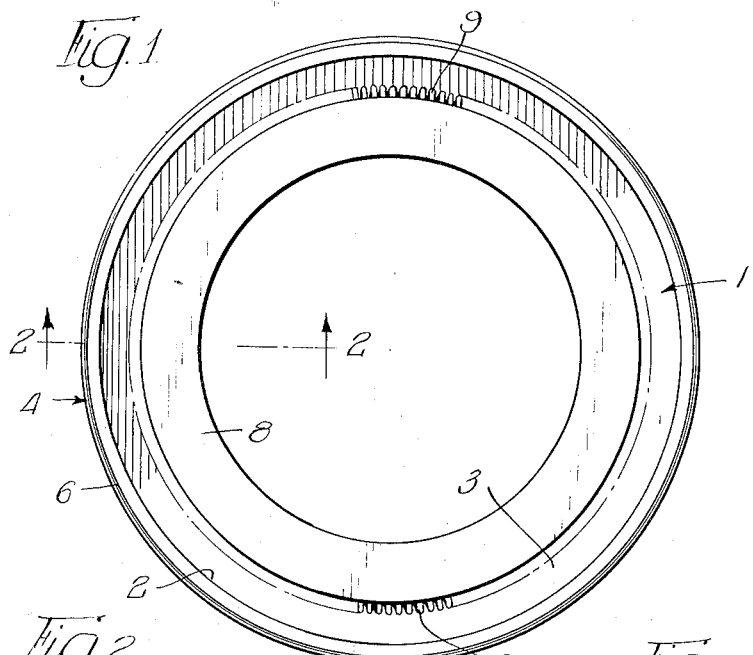
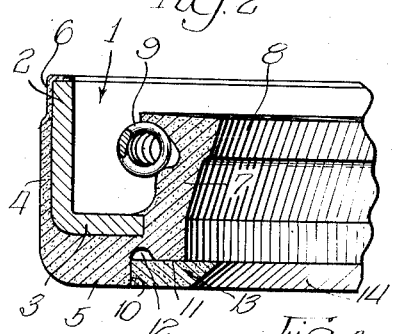
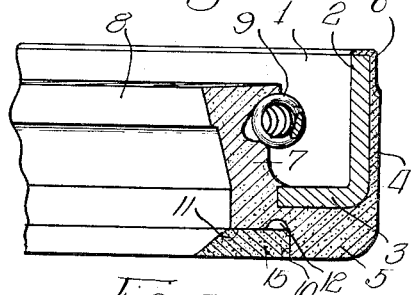
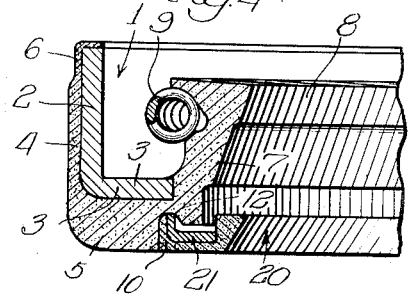
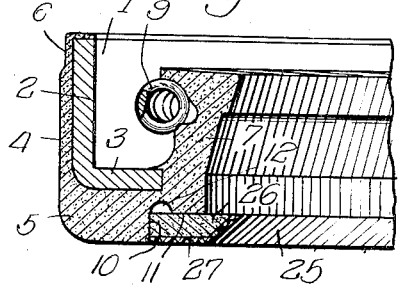
INVENTOR.
Thomas O. Kosatka,
BY George D. Haight +
George H. Simmons
Attys.

United States Patent Office 2,695,801
Patented Nov. 30, 1954

2,695,801

FLUID SEAL

Thomas O. Kosatka, Chicago, Ill., assignor to Victor Manufacturing & Gasket Co., Chicago, Ill., a corporation of Illinois Application October 23, 1953, Serial No. 387,838

8 Claims. (Cl. 288—3)

This invention relates to devices for sealing the space between a shaft and a housing through which the shaft projects, and has for its principal object the provision of a new and improved device of this kind.

It is a main object of the invention to provide a self-contained device for forming a fluid tight seal between a shaft and a housing, through which the shaft projects, which device is provided with two shaft-engaging sealing lips composed of dissimilar material.

Another object of the invention is to provide a sealing device having two sealing lips which may be assembled in the device with the lips pointing in the same or in opposite directions.

Another object of the invention is to provide a sealing device in which a basic unit contains a shell and one sealing lip, to which unit a secondary sealing lip composed of any one of a number of different materials may be added and permanently secured.

Another object of the invention is to provide a sealing device which can be made in a plurality of different forms with a minimum of tooling and labor and consequently at low cost.

Further objects of the invention not specifically mentioned here will be apparent from the description and claims which follow, reference being had to the accompanying drawings in which a preferred embodiment of the invention is shown by way of example and in which:

Fig. 1 is a plan view of the sealing device;

Fig. 2 is a fragmentary cross sectional view drawn to an enlarged scale and taken substantially along the line 2—2 of Fig. 1, looking in the direction of the arrows;

Fig. 3 is a fragmentary view similar to Fig. 2, showing a modified form of the device;

Fig. 4 is a cross sectional view similar to Fig. 2, showing another form of the device; and Fig. 5 is a cross sectional view similar to Figs. 2 and 4 and showing still another form of the device.

In the manufacture of many machines, reciprocating or rotating shafts are projected through bores in a housing and sealing devices are employed to seal the space between the shaft and the housing thereby to prevent the escape of fluids from the housing along the shaft. Manufacturers of such machines specify various sealing arrangements, which specifications must be met by the producers of the sealing devices.

In one instance a self-contained sealing unit employing two lips in engagement with the shaft is required and it is specified that these lips must be composed of different materials and the seals arranged partly with both sealing lips positioned to prevent the escape of fluids from the housing and partly with the lips opposed so that the second lip prevents entry of dust and the like into the housing.

Heretofore, to meet these specifications, it has been necessary to provide a metal encased seal in which there are a plurality of sealing elements clamped or otherwise fixed in accordance with the specification of the manufacturers. Such seals, being composed of a multiplicity of parts, are expensive, due to the large number of dies required to manufacture a specific seal and further due to the amount of labor required in the various operations of assembling the seal.

It is to the production of a cheaper seal of this type that the present invention is particularly concerned.

In its preferred form, the sealing device of the present invention consists of a metallic cuplike shell having a radial wall and an outer cylindrical wall to which is bonded an elastomer that is impervious to the fluids with which the seal comes into contact.

The wall of elastomer on the outer diameter of the shell is thin and incorporates a lead-in ring such as is shown in my Patent 2,651,534, issued September 8, 1953. Extending inwardly from the shell is the main sealing lip which is equipped with a garter spring by which it is maintained in seal-forming engagement with the shaft.

A secondary sealing lip, formed as a separate unit which may be composed of material the same as or different from that in the main sealing lip, is inserted in the device and secured therein by cementing. The secondary sealing lip may be turned in the same direction as the main lip or in the opposite direction, as desired. As a result of this construction, a wide variety of specific arrangements can be built into the devices with a minimum of tool and die cost and the devices assembled with a minimum of labor. As a result, the manufacturers' specifications can be met at lower cost than heretofore without sacrificing quality.

The invention will be best understood by reference to the drawings in which it will be seen that the metallic cup, indicated generally at 1, has an outer cylindrical wall 2 and an annular wall 3 projecting radially inwardly from one end thereof. An elastomer element consisting of an outer cylindrical wall 4, preferably no thicker than the metal in the shell 1, and an annular portion 5 are fixed to the metallic shell preferably by chemical bonding. The outer cylindrical wall 4 is provided with a lead-in ring 6 to facilitate placing the sealing unit in the housing.

Extending inwardly and upwardly from the inner edge of the annulus 3 of the shell is a generally frusto-conical extension 7 of elastomer terminating in a main sealing lip 8 that engages the shaft. A garter spring 9 fits in a groove in the outer periphery of the sealing element to hold the sealing lip tightly against the shaft.

Adjacent the inner edge of the portion 5 of the elastomer element is a cylindrical shoulder 10 and an annular shoulder 11 defining between them a recess 12 and an annular recess 13 into which a secondary sealing lip 14 is fitted and secured, preferably by cementing. The cement engages the shoulders 10 and 11 and flows into the recess 12 as the lip 14 is forced into place. Shoulders 10 and 11 being located in juxtaposition to the inner edge of the annular portion 3 of the metallic shell, position the secondary sealing lip so as to properly engage a shaft.

In the embodiment shown in Fig. 2, the sealing lip 14 is composed of leather and is installed in the same direction as the main sealing lip 8 so as to reinforce the main sealing lip in the wiping of oil from the shaft thereby to prevent escape of the oil from the vehicle. In the embodiment shown in Fig. 3, the leather sealing lip 15 is inserted in a reverse direction to provide a dust wipe preventing the entry of dust into the bearing and lubricant.

In the embodiment of the invention shown in Fig. 4, the main unit consisting of the shell 1 and main sealing lip 8 is equipped with a secondary sealing unit 20 composed of an elastomer which may be of different composition from that in the main unit and is provided with an L-shaped metallic ring 21 to which the elastomer is bonded. The cylindrical portion of this ring extends into the recess 12 and the elastomer on the outer diameter of this cylindrical portion engages the shoulder 10. Cement is applied to the second sealing element and as the element is forced into the main element, the annular portion 5 of the elastomer in the main element will be forced outwardly. When the seal is inserted in a housing and the outer cylindrical wall 4 compressed thereagainst, annulus 5 will be forced inwardly thereby tightening the grip upon the second sealing element 20 to insure that it will be securely held in place.

In the embodiment of the invention shown in Fig. 5, the second sealing lip 25 consists of a main annulus 26 composed of elastomer and a facing fabric 27 covering the shaft-engaging portions of the lip. The element 25 is cemented in place as before.

Thus it will be seen that the sealing device of the present invention consists of a main unit containing a metallic shell and an elastomer element bonded thereto, which unit can be manufactured at low cost without sacrificing quality. If desired, the unit may be used alone in instances where a single sealing lip is all that is required. The second sealing lip, formed as a separate unit out of any one of a number of compositions selected to meet the requirements of the trade, is inserted in the main unit and securely fixed therein, preferably by cementing. The second sealing lip may be positioned so as to form a second grease wiping element in the seal or reversed to form a dust block.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. In an oil seal, a cuplike shell having an outer cylindrical wall and an annular wall extending radially inwardly from one end of the cylindrical wall, an elastomer element fixed to the outer surfaces of said walls and extending inwardly therefrom and terminating in a sealing lip disposed within the shell and concentrically to said cylindrical wall, a garter spring encircling said sealing lip for tensioning the lip radially inwardly; cylindrical and annular shoulders in said elastomer in juxtaposition to the inner edge of the annular wall of the shell, said shoulders defining an annular recess opening inwardly of the seal; and a secondary sealing lip composed of material dissimilar to the elastomer element, cemented in said recess and projecting therefrom radially inwardly of the seal.

2. An oil seal as specified in claim 1, in which the secondary sealing lip is composed of leather.

3. An oil seal as specified in claim 1, in which the secondary sealing lip terminates on a cylinder through the first lip and concentric to the outer cylindrical wall of the shell.

4. An oil seal as specified in claim 1, in which the inner edge of the secondary sealing lip tapers to a point located on the side of the lip adjacent the first lip.

5. An oil seal as specified in claim 1, in which the inner edge of the secondary sealing lip tapers to a point located on the side of the lip away from the first lip to provide a dust stop.

6. An oil seal as specified in claim 1, in which the secondary sealing lip is composed of an elastomer of different composition than the first lip and carries a fabric facing on the surfaces that are adapted to engage a shaft.

7. An oil seal as specified in claim 1, in which the secondary sealing lip is composed of an elastomer that is bonded to a metal annulus which is cemented to the annular shoulder of the elastomer element.

8. An oil seal as specified in claim 1, in which the annular shoulder is spaced inwardly of the cylindrical wall defining therewith a cavity into which may flow the cement that holds the secondary lip in the seal.

No references cited.